United States Patent
Petersen et al.

(10) Patent No.: US 8,725,946 B2
(45) Date of Patent: May 13, 2014

(54) MASS STORAGE SYSTEM AND METHOD OF USING HARD DISK, SOLID-STATE MEDIA, PCIE EDGE CONNECTOR, AND RAID CONTROLLER

(75) Inventors: Ryan Maurice Petersen, San Jose, CA (US); Franz Michael Schuette, Colorado Springs, CO (US)

(73) Assignee: OCZ Storage Solutions, Inc., San Jose, CA (US)

(*) Notice: Subject to any disclaimer, the term of this patent is extended or adjusted under 35 U.S.C. 154(b) by 34 days.

(21) Appl. No.: 13/211,760

(22) Filed: Aug. 17, 2011

(65) Prior Publication Data

US 2011/0320690 A1    Dec. 29, 2011

Related U.S. Application Data

(63) Continuation-in-part of application No. 12/713,349, filed on Feb. 26, 2010.

(60) Provisional application No. 61/162,488, filed on Mar. 23, 2009.

(51) Int. Cl.
*G06F 12/00* (2006.01)

(52) U.S. Cl.
USPC ........... 711/117; 711/103; 711/104; 711/114; 710/314; 714/14; 714/22; 361/760

(58) Field of Classification Search
USPC .................. 711/103, 117, 114, 104; 361/760, 361/679.58; 714/14, 22; 710/314
See application file for complete search history.

(56) References Cited

U.S. PATENT DOCUMENTS

| | | | |
|---|---|---|---|
| 6,467,022 B1* | 10/2002 | Buckland et al. | 711/113 |
| 2009/0231798 A1* | 9/2009 | Skinner | 361/679.31 |
| 2009/0259882 A1* | 10/2009 | Shellhamer | 714/7 |
| 2010/0306452 A1* | 12/2010 | Weber et al. | 711/103 |
| 2011/0047356 A2* | 2/2011 | Flynn et al. | 712/220 |
| 2011/0066882 A1* | 3/2011 | Walls et al. | 714/6.24 |

OTHER PUBLICATIONS

Fusion-io web page; ioDrive; 3 pages; 2010.

* cited by examiner

*Primary Examiner* — Hong Kim
(74) *Attorney, Agent, or Firm* — Hartman Global IP Law; Gary M. Hartman; Michael D. Winter (57) ABSTRACT

Methods and systems for mass storage of data over two or more tiers of mass storage media that include nonvolatile solid-state memory devices, hard disk devices, and optionally volatile memory devices or nonvolatile MRAM in an SDRAM configuration. The mass storage media interface with a host through one or more PCIe lanes on a single printed circuit board.

15 Claims, 6 Drawing Sheets

MASS STORAGE SYSTEM AND METHOD OF USING HARD DISK, SOLID-STATE MEDIA, PCIE EDGE CONNECTOR, AND RAID CONTROLLER

CROSS REFERENCE TO RELATED APPLICATIONS

This is a continuation-in-part patent application of U.S. patent application Ser. No. 12/713,349, filed Feb. 26, 2010, which claimed the benefit of U.S. Provisional Application No. 61/162,488, filed Mar. 23, 2009. This application is also related to U.S. patent application Ser. No. 12/815,661, filed Jun. 15, 2010, which claimed the benefit of U.S. Provisional Application No. 61/218,571, filed Jun. 19, 2009. The contents of these prior applications are incorporated herein by reference.

BACKGROUND OF THE INVENTION

The present invention generally relates to mass storage devices for use with host systems, including computers and other processing apparatuses. More particularly, this invention relates to a PCIe-based mass storage system that utilizes a hybrid drive comprising at least one high capacity hard disk component for low-frequency accessed data in a host system, along with at least one nonvolatile solid-state component for system data and intermediate storage of high-frequency accessed data in the host system.

Nonvolatile memory subsystems and mass storage devices of modern computers are typically addressed through the system bus using the southbridge or any equivalent logic, for example, an input/output (I/O) controller hub (ICH) introduced by Intel Corporation. A deviation from this scheme is the PCI express (PCIe) bus having branches originating from either node of the system core logic, including integrated system agents or un-cores embedded into modern central processing unit (CPU) dies.

PCIe has become the fast system interconnect bus of choice, and offers in its latest generation (V3.x) 1 GB/s bandwidth in each direction. Particularly the branches tied to the first node in the interconnect cascade further have ultra low latency which makes them extremely suitable for any kind of data access. Another advantage of the PCIe interconnect or any expansion slot implementation is that it offers the user a high degree of freedom with respect to populating the system with peripheral devices including nonvolatile memory devices or mass storage media.

In the past, storage-related add-on cards were typically small computer system interface (SCSI) or RAID controllers with better performance or richer feature sets than on-board host bus adapters for parallel or serial ATA devices attached via cables to the card. However, as a consequence of the miniaturization of drive technology, including weight reduction, and the introduction of solid-state media, separation and cable connectivity between the interface and the actual storage media are no longer a prerequisite. A consequent trend has been the development of new form factors, including the integration of the data carrier onto an interface card along with the control logic for a streamlined, cable-less and ultra-compact device. For a number of reasons, specifically relating to weight, space constraints and power, this type of integrated PCIe-based storage device has mostly been restricted to the use of solid-state media.

Solid-state media, particularly NAND flash memory devices, have the advantage of allowing random access of data in the array over several parallel channels, and therefore it is far superior to rotatable media with respect to access speed, I/O switching and, moreover, sustained data transfer rates. On the downside, however, NAND flash memory cannot compete with rotatable media on cost per bit, nor with respect to data retention. Specifically, whereas magnetic media such as rotatable platters have practically unlimited data retention, NAND flash cells lose data through stress-induced leakage current during normal operation, as well as simple diffusion of electrons from the floating gate through the gate oxide layer into the substrate during normal operation and when the device is powered down.

In contrast to initial expectations regarding solid-state drives (SSD) becoming a complete replacement of hard disk drives (HDD) as the mass storage media used in computers, what has emerged in practice is a functional dichotomy between solid-state drives and hard disk drives. SSDs are gaining acceptance in any function or role warranting frequent access of data. This particular scenario not only fits the strength of SSDs in delivering high I/O throughput, but further adds the benefit that, because of frequent accesses, data integrity can be easily monitored through the bit error rate of a block or page on any given read access. Any increase in the bit error rate can then be used as an indicator for creeping data deterioration through leakage current. Understandably, monitoring bit error rates requires read access of the data, which puts rarely accessed files at a greater risk of corruption than files that are frequently monitored. In so far, NAND flash memory may not be the optimal storage medium.

The other end of the spectrum focuses on archiving of rarely accessed data. The majority of this type of data tends to be multimedia files such as photographs or movie clips, or archived documents including personal data, records or even e-books that are collected after purging them from the reader of choice. This type of data may not be accessed for months or years and, while it would be possible to move them to an offline vault or burn them to optical media, it is more in line with the digital life style to have the archive available at any time, for example in the form of a centralized server.

For a simplified design of any such centralized media and document server, it would be highly advantageous to have a solution that reduces space requirements by providing a highly integrated device featuring hybrid storage technology in combination with intelligent data management to combine the best features of both solid-state and rotatable (hard disk) media with respect to access speed, I/O performance and data retention at the lowest cost per bit.

BRIEF DESCRIPTION OF THE INVENTION

The present invention provides methods and systems capable of capitalizing on fast access capabilities (low initial access latencies) of nonvolatile solid-state memory technologies currently available for use in host systems (including computers and other processing apparatuses), in combination with large capacity electromechanical storage devices with minimal degradation of data over time.

According to a first aspect of the invention, an integrated PCIe-based mass storage system is provided comprising a printed circuit board that is electrically compatible with a PCIe interface, an edge connector on the printed circuit board, at least one solid-state mass storage device having nonvolatile solid-state memory components and at least a first controller that interfaces with the nonvolatile solid-state memory components, at least one hard disk mass storage device having at least one hard disk drive with a rotatable platter, and a RAID controller that interfaces with the hard disk mass storage device. The mass storage system is configured so that the solid-state mass storage device stores files with a read access frequency above a threshold, the hard disk mass storage device stores files with a read access frequency below the threshold, and if the read access frequency of a file stored on the hard disk mass storage device increases above the threshold, a copy of the file is written to the solid-state mass storage device.

According to a second aspect of the invention, a method is provided for permanently storing data on an integrated PCIe-based mass storage system comprising a printed circuit board that is electrically compatible with a PCIe interface, an edge connector on the printed circuit board, at least one solid-state mass storage device having nonvolatile solid-state memory components and at least a first controller that interfaces with the nonvolatile solid-state memory components, at least one hard disk mass storage device having at least one hard disk drive with a rotatable platter, a RAID controller that interfaces with the hard disk mass storage device, and optionally at least one memory module having memory components associated with the solid-state mass storage device. The method includes determining a frequency of access for a file stored on the hard disk mass storage device and copying the file to the solid-state mass storage device if the access frequency is above a threshold, and then updating the access path or metadata for the file to point to the solid-state mass storage device.

According to a third aspect of the invention, an integrated PCIe-based mass storage system is provided comprising a printed circuit board that is electrically compatible with a PCIe interface, an edge connector on the printed circuit board, at least one volatile memory module having volatile memory components, at least one solid-state mass storage device having nonvolatile solid-state memory components and at least a first controller that interfaces with the nonvolatile solid-state memory components, at least one hard disk mass storage device having at least one hard disk drive with a rotatable platter, and a RAID controller that interfaces with the hard disk mass storage device. The mass storage system is configured so that the volatile memory module is a cache for the solid-state mass storage device, the solid-state mass storage device permanently stores data with an access frequency above a threshold, the hard disk mass storage device stores data with an access frequency below the threshold.

According to another aspect of the invention, a method is provided for permanently storing data on an integrated PCIe-based mass storage system comprising a printed circuit board, an edge connector adapted to interface with a PCIe expansion slot, first and second RAID controllers interfacing with the edge connector through a PCIe switch, at least two solid-state mass storage devices in a striped array and each solid-state mass storage device having nonvolatile solid-state memory components functionally connected to the first RAID controller, multiple hard disk mass storage devices functionally connected to the second RAID controller and each hard disk mass storage devices having at least one hard disk drive with a rotatable platter, and a 64-bit wide DRAM memory module as cache for the solid-state mass storage devices. The memory module is configured into a functional upper 32-bit block and a lower 32-bit block, with each of the upper and lower 32-bit blocks having separate command and address buses. The upper 32-bit block is a cache for a first of the solid-state mass storage devices and the lower 32-bit block is a cache for a second of the solid-state mass storage devices. The method includes copying a file accessed from the hard disk mass storage devices to one of the caches provided by the memory module and updating the access path for the file to point to the solid-state mass storage devices, and storing a copy of the file in the nonvolatile solid-state memory components of the solid-state mass storage devices if the host system writes the file back to the mass storage system; determining a frequency of access of the file; storing the file to the hard disk mass storage devices if the frequency of access drops below a threshold; and deleting the file from the solid-state mass storage device.

A technical effect of this invention is the ability of the mass storage system to combine advantageous aspects of different types of nonvolatile mass storage media to create multiple tiers of storage. Commitment of individual blocks of data into such a multi-tiered mass storage system can be managed by a hierarchical storage management (HSM) implementations of types known in the art.

Other aspects and advantages of this invention will be better appreciated from the following detailed description.

DETAILED DESCRIPTION OF THE INVENTION

The current invention is directed to a system that combines advantageous aspects of different types of nonvolatile mass storage media, and particularly nonvolatile solid-state mass storage devices and electromechanical mass storage devices, within a fully integrated device that is compatible with the PCIe standard interface in personal computers and servers. In preferred embodiments, such a PCIe-based mass storage system uses nonvolatile memory technologies as a storage tier, and electromechanical mass storage devices such as rotatable platter-based hard disk drives as another storage tier having practically unlimited data retention. Particularly preferred embodiments of the invention further incorporate volatile memory technologies, for example, DRAM (dynamic random access memory), that are characterized by ultra-fast access times and extremely low error rates, to provide yet another tier of storage. Commitment of individual blocks of data into such a three-tiered mass storage system can be managed by a hierarchical storage management (HSM) implementation of a type that is known in the art and can either run on system software or be implemented in hardware, for example, a field programmable gate array (FPGA) or application specific integrated circuit (ASIC).

Current mass storage devices typically center on one distinct technology. For example, hard disk drives (HDDs) use nonvolatile (permanent) magnetic platters, solid-state drives (SSDs) use nonvolatile (permanent) solid-state memory devices, and system memory use volatile memory devices that often serve as a disk cache. None of these different media is perfect for all applications, and there are shortcomings associated with each. For example, volatile memory devices such as DRAM have the fastest access times and lowest error rates of existing memory devices, the volatile nature of the media results in data retention only while power is supplied. Furthermore, implementation of a large (TeraByte) mass storage system based on DRAM would be cost prohibitive and exceed the power budget of most host systems, including computers and other processing apparatuses. Nonvolatile memory devices such as NAND flash offer acceptable performance at a reasonable price point, yet have limitations relating to long-term data retention. Rotatable platters of hard disk drives, which are accessed through mechanical movements of a read/write head over the tracks and sectors, have practically unlimited data retention and are extremely cost efficient. However, rotatable platters are limited by slow access times and, since the data stream is strictly serial, there are limitations with respect to the overall data throughput.

The present invention provides a PCIe-based mass storage system that uses at least two of the above-mentioned storage media, such that the mass storage system can be referred to as a hybrid storage system. In the mobile sector, HDD/SSD hybrids already exist, for example, the Seagate Momentus® XT. However, such devices use a relatively small amount of NAND flash memory in a manner similar to a prefetch/read cache. That is, writes are initially committed to the HDD platters and, on a read access, data are fetched into the NAND flash array. Consequently, the device does not offer much in terms of write I/O performance increase.

Figure 1:
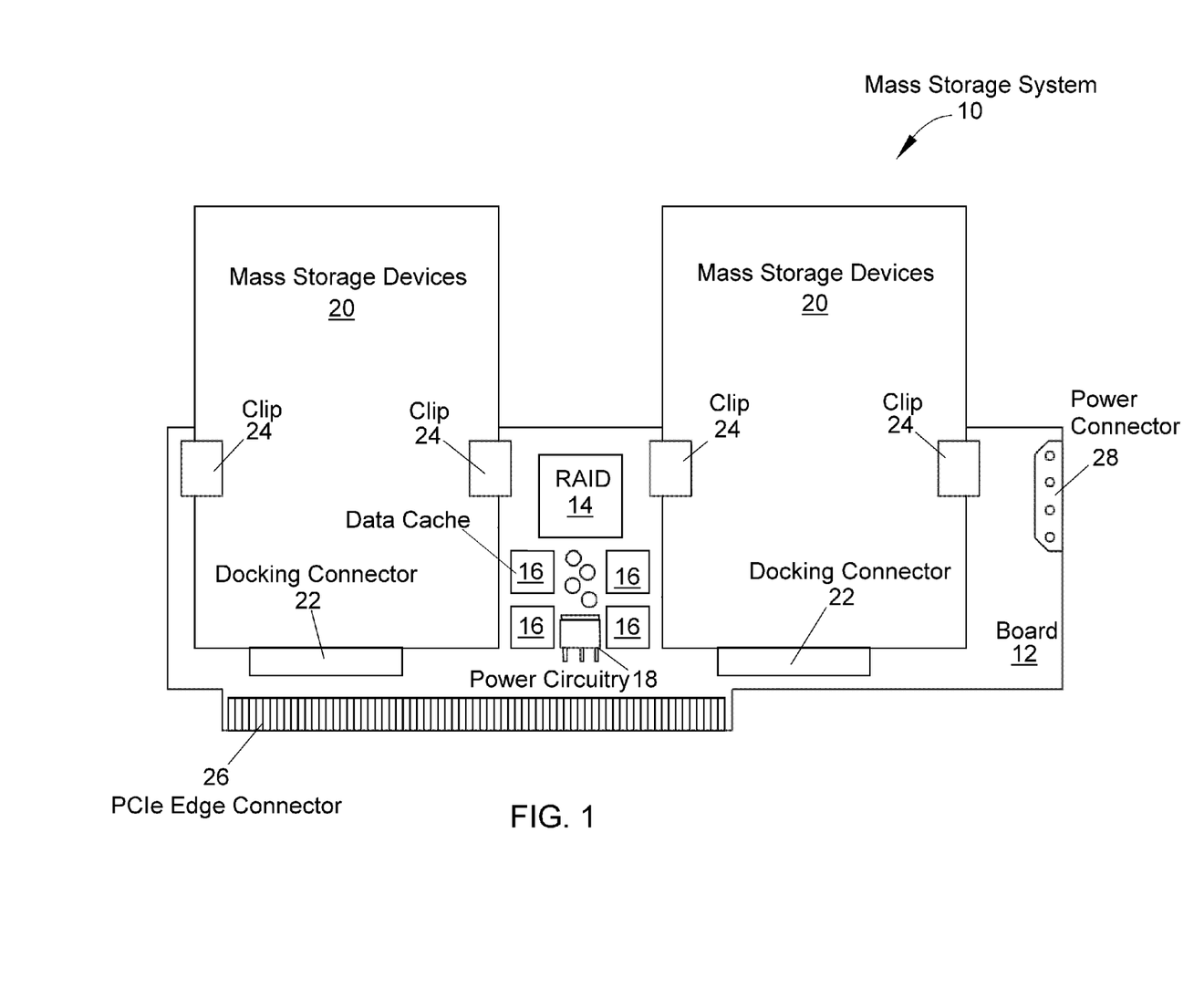
FIG. 1 schematically represents a PCIe-based mass storage system in a modular configuration that includes a carrier board, a RAID controller, and solid-state drives and hard disk drives that are removably mounted to the carrier board to define a two-tiered storage system.
Figure 2:
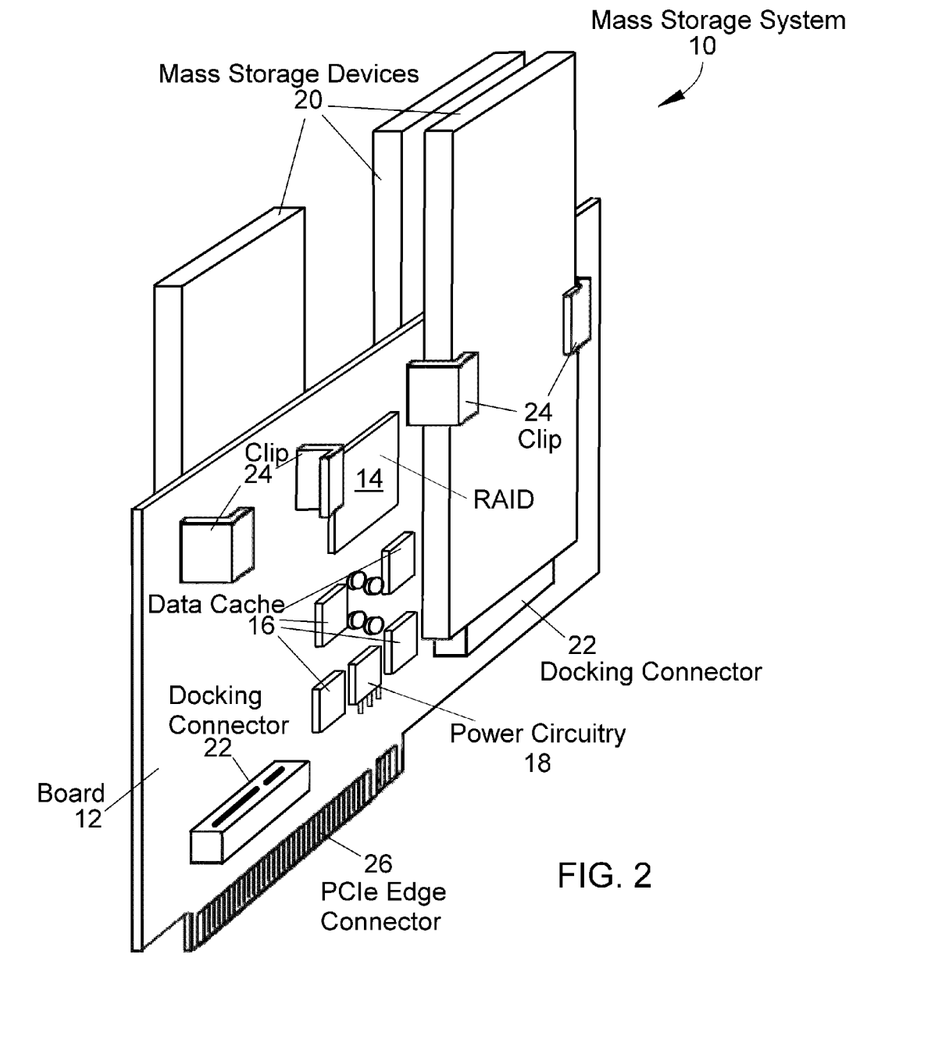
FIG. 2 schematically represents a simplified perspective view of the storage system of FIG. 1 with three drives mounted at its front and back faces of its carrier board.

FIGS. 1 and 2 schematically represent an embodiment of a PCIe-based mass storage system 10 having a modular configuration. The mass storage system 10 includes a carrier board 12, a RAID controller 14, a data cache 16 for data buffering, power circuitry 18 (including, for example, voltage regulator and capacitors), and a hybrid mass storage system comprising nonvolatile mass storage devices 20 that are removably mounted on the carrier board 12 of the storage system 10 with docking connectors 22 and retention clips 24. The carrier board 12 can be a printed circuit board of the type commonly used as expansion cards and host bus adapters (HBA). The data cache 16 is made up of volatile memory components, preferably in the form of DRAM chips, and is used to buffer writes and/or prefetch reads from the storage devices 20. The storage devices 20 can have male connectors (not shown) by which they are directly plugged into the female docking connectors 22, which preferably provide both power and data connections for the storage devices 20. Alternatively, the storage devices 20 could have female connectors that connect to a male edge connector on the carrier board 12, for example, as disclosed in U.S. patent application Ser. No. 12/783,978. Particularly preferred docking connectors 22 are SATA connectors. The system 10 is further represented as comprising a system expansion slot interface in the form of a PCIe edge connector 26, which provides an interface for an expansion slot of a motherboard (not shown) of a host system. All data and power buses (not shown) are integrated into the carrier board 12, and the edge connector 26 enables power to be supplied to the mass storage system 10 and data exchange between the system 10 and its motherboard. An auxiliary power connector 28 is also shown by which additional power can be supplied to the system 10, if so desired. Electrical connections (not shown) on the carrier board 12 can be achieved in accordance with conventional industry practices.

According to a preferred aspect of the invention, individual mass storage devices 20 of the mass storage system 10 comprise either an array of solid-state drives that access nonvolatile memory components through a multi-channel interface, or one or more hard disk drives for use as a large (for example, TeraByte) capacity storage repository. The storage capacity of the repository can be achieved with a single hard disk drive or with an array of individual HDD drives (units), preferably in a RAID Level 5 configuration that, in combination with the RAID controller 14, provides redundancy and allows for rebuilding of the array without data loss in the case of failure of one of the drives. The overall design of the PCIe-based mass storage system 10 is represented as being modular, that is, each individual device 20 can be removably installed on the system 10 in order to provide a flexible configuration that facilitates maintenance of the system 10, including replacement of defective drives and upgrades to larger capacity drives. Alternatively, some or all of the devices 20 or their memory components could be fully integrated onto the carrier board 12 of the system 10.

The mass storage system 10 of FIGS. 1 and 2 can be referred to as a two-tiered storage system, in which a first storage tier (level) of the system 10 is provided by at least one storage device 20 that uses solid-state technology (hereinafter, SSD storage device(s) 20), and a second storage tier (level) of the system 10 is provided by at least one storage device 20 that uses hard disk drive technology (hereinafter, HDD storage device(s) 20). Arrays of NAND flash memory devices (not shown) are particularly preferred for use as the solid-state memory in the SSD storage devices 20, though the use of other solid-state memory technologies is also foreseeable, for example, phase change memory, magnetic RAM, and magneto-resistive RAM. A storage device 20 made up of NAND flash memory devices will typically feature a SATA or SAS interface (not shown) to communicate with the edge connector 26 of the carrier board 12. The NAND flash memory devices can be accessed by a multi-channel NAND flash interface, which can be optionally capable of compression/decompression of data in hardware while implementing de-duplication algorithms. In the two-tiered configuration of FIGS. 1 and 2, all data transfers received from the host system can be initially written to the SSD storage device(s) 20. If a given set of files stored on a SSD storage device 20 is not accessed within a certain period of time, the files are copied to an HDD storage device 20 of the system 10, after which the files can be purged from the NAND flash memory devices of the SSD storage device 20, for example, using HSM algorithms that can be implemented in system software or with dedicated hardware, for example, an FPGA or ASIC.

In the simplest case, the time stamp of any file written to the SSD storage device 20 can be logged to a dedicated file to keep track of vital parameters, for example, when the file was written to the SSD storage device 20, when it was first and last read from the SSD storage device 20, and the number of accesses during a defined time interval. Using the above-noted HSM functionality, the mass storage system 10 is further capable of executing HSM algorithms based on data access frequency analysis using the SSD storage devices 20 as a first storage tier and the HDD storage devices 20 as a second storage tier. In particular, the mass storage system 10 is configured so that files that have read access frequencies above a predetermined threshold are stored on the SSD storage devices 20, and files that have read access frequencies below the predetermined threshold are stored on the HDD storage device 20. If the read access frequency of a file stored on a HDD storage device 20 increases above the threshold, a copy of the file is written to a SSD storage device 20. On the other hand, if the read access frequency of a file stored on an SSD storage device 20 decreases below the threshold, a copy of the file is written to a HDD storage device 20 and the file is purged from the SSD storage device 20. Purging in this respect can mean that the file is invalidated through a hierarchical storage manager or on the level of the file system. As soon as the file-related data on the SSD storage device 20 are invalidated, they can be subjected to garbage collection and a subsequent erase process.

In some cases, it may be advantageous to write the access frequency of a given file to a translation look-aside buffer, such as a content addressable memory (CAM). The access frequency then becomes the address or access parameter to generate as an output the physical or logical addresses of files within the array of NAND flash memory devices of the SSD storage device 20 at or below the frequency entered as criterion. A simple routine could set a threshold that automatically generates an access of the file tied to a purge command to write out the data to an HDD storage device 20 and mark the respective pages of the NAND erase block as stale. Through garbage collection and TRIM, any valid data within the several erase blocks containing stale data can be coalesced and the free blocks can be committed to erasing.

Figure 3:
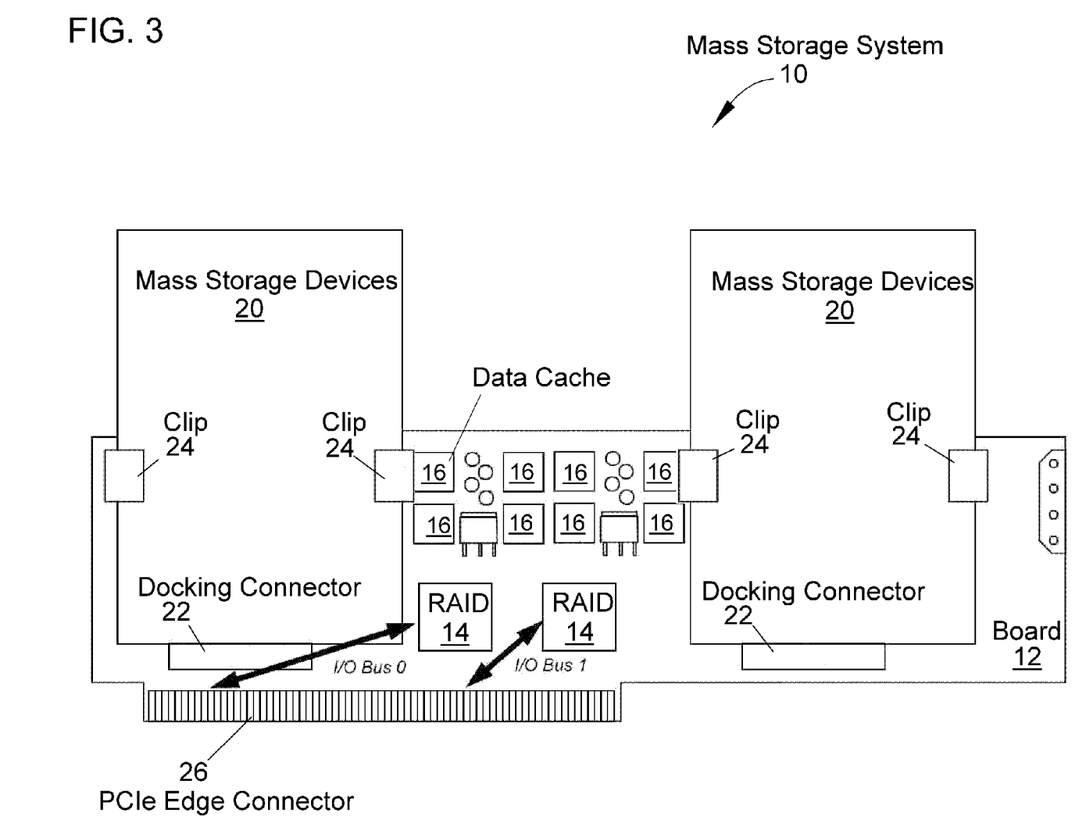
FIG. 3 schematically represents an embodiment of a PCIe-based mass storage system, in which two RAID controllers are implemented on the same carrier board of the mass storage system, and each RAID controller occupies its own set of PCIe lanes.

As represented in FIGS. 1 and 2, the mass storage system 10 has a single logical system interface and a single RAID controller 14 for all of the storage devices 20 of the system 10. In the embodiment of FIG. 3, a similar mass storage system 10 is represented as comprising two different RAID controllers 14 on the carrier board 12. (For convenience, consistent reference numbers are used in FIG. 3 to identify elements that are the same or functionally equivalent to elements of FIGS. 1 and 2). Another alternative is for the mass storage system 10 to use one RAID controller 14 and a more conventional PCIe-based host bus adapter (not shown) in place of the second RAID controller 14 on the carrier board 12. Each controller and/or host bus adapter 14 preferably occupies its own set of PCIe lanes, such that mass storage system 10 appears to its host system as two distinct mass storage systems. For example, given the relatively low bandwidth required by hard disk drives, it may suffice to use a single-lane PCIe interface for communication between the host system and the controller 14 for the HDD storage devices 20, while four PCIe lanes are used for communication between the host system and the controller (NAND flash controller) 14 of the SSD storage devices 20. Other combinations of PCIe lanes are also possible. For example, it is conceivable that the controller 14 for the NAND flash portion (SSD storage devices 20) of the system 10 may occupy eight PCIe lanes, whereas the controller 14 for the HDD portion (HDD storage devices 20) of the system 10 uses four PCIe lanes. In either case, if two separate controllers 14 are used, data written from the HDD to the SSD portions (or vice versa) go through the system interface (edge connector 26) in order to be written to system memory before being written back to the intended storage device 20.

PCIe lane splitting as discussed above is supported by the existing PCIe specifications, though as an optional feature. Many implementations of PCIe may lack support of this feature. For the purpose of better compatibility, a PCIe switch or arbitrator may be used to interface with all PCIe lanes of the system 10 at the host system interface level, and then arbitrate the lanes either through physical splitting or through time-division multiplexing. Given the latencies of either HDDs or NAND flash-based SSDs, additional latencies associated with a PCIe switch or arbitrator would be considered negligible.

On the other hand, a single controller 14 can be used to access the HDD and SSD storage devices 20 as long as enough device connections are available, as would be the case, for example, in an 8-channel RAID controller 14. For example, in this type of configuration, six HDD storage devices 20 could be used in a RAID Level 5 configuration with distributed parity to maximize capacity, while maintaining full redundancy. At the same time, two channels could be dedicated to two SATA 6.0 interfaces in a RAID 0 configuration, allowing for maximum sequential transfer rates of 1.2 GB to or from the SSD storage devices 20. Another possibility is to use an HSM algorithm implemented in dedicated hardware, for example, an FPGA or ASIC.

Figure 4:
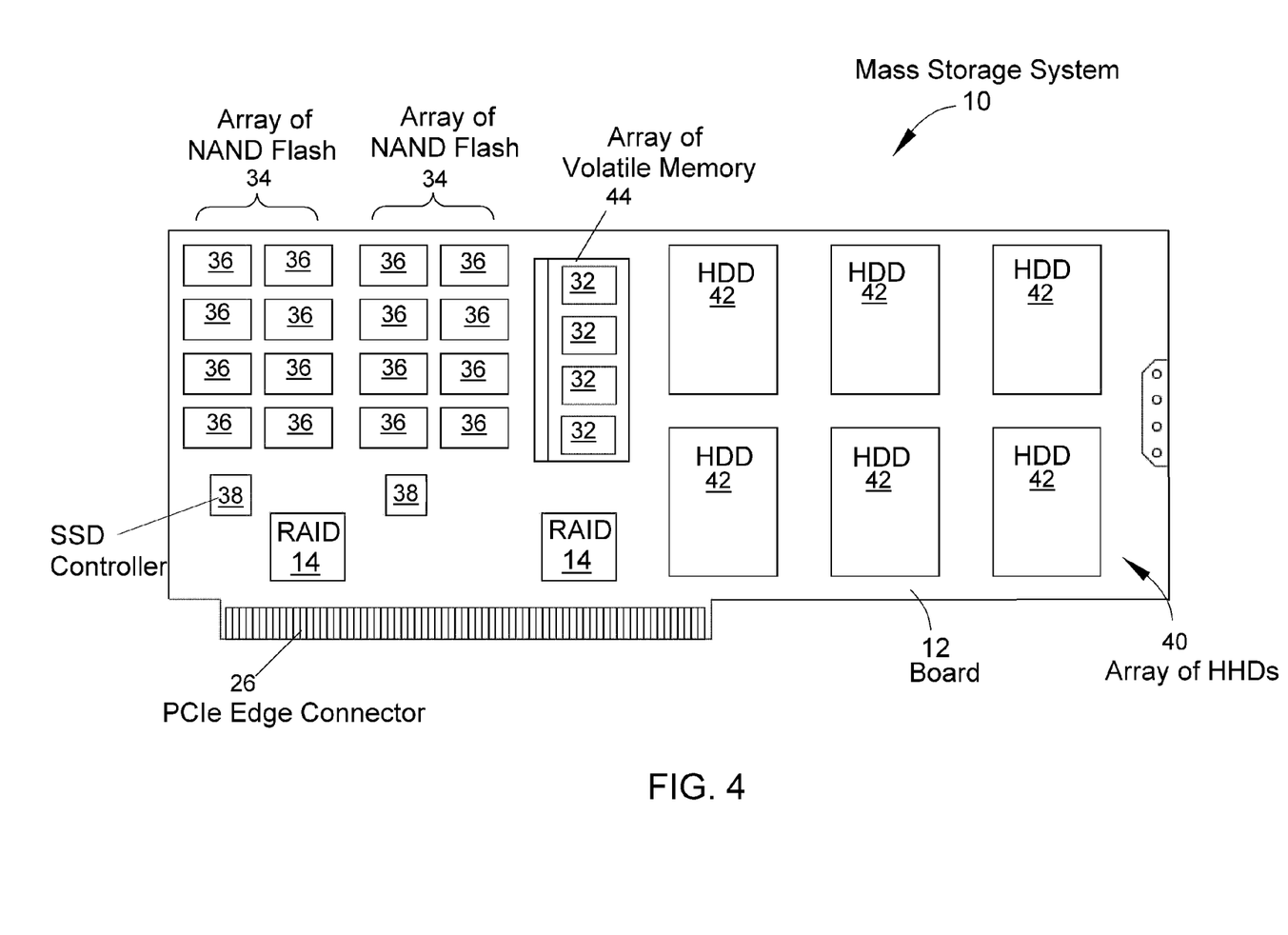
FIG. 4 schematically represents another embodiment of a PCIe-based mass storage system, in which an array of hard disk drives, a solid-state drive comprising an array of nonvolatile memory components, and an array of volatile memory components are directly mounted on a carrier board of the mass storage system to define a three-tiered storage system
Figure 5:
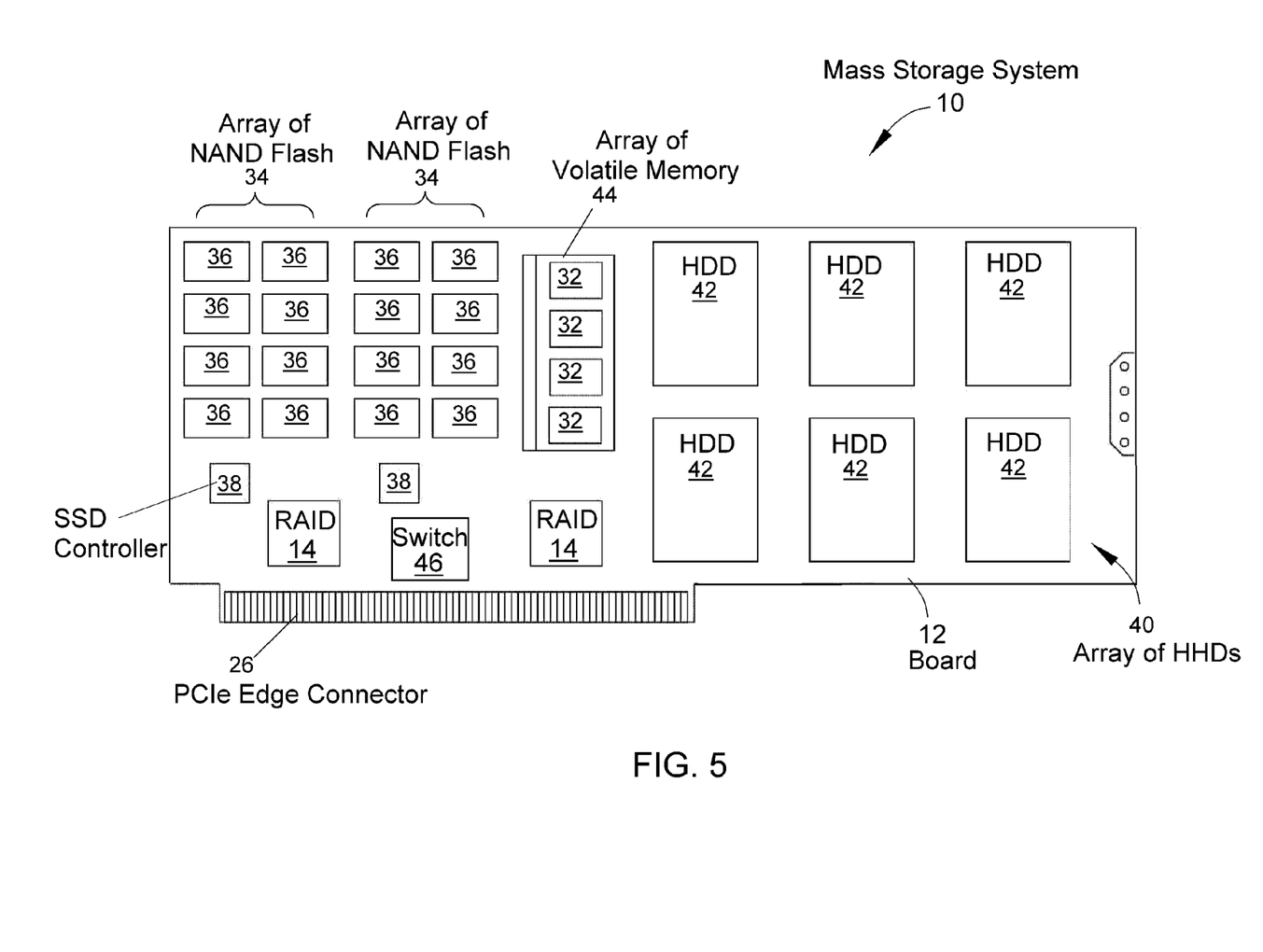
FIG. 5 shows a similar embodiment as FIG. 4, but further including a PCIe switch adapted for interfacing with the system logic.
Figure 6:
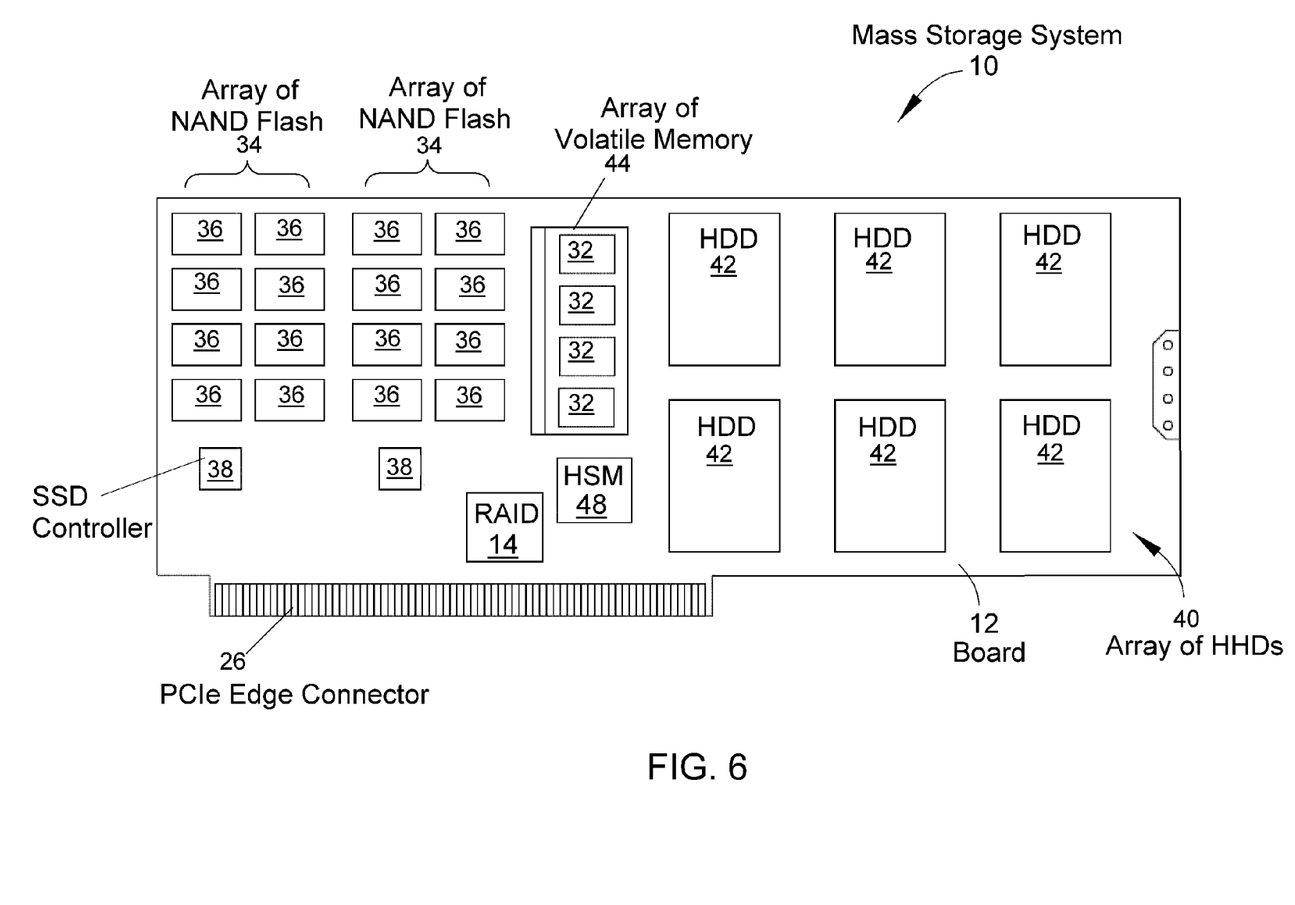
FIG. 6 schematically represents a similar embodiment of the invention as FIG. 4, but with a single controller in an eight-channel PCIe configuration with one array in striping configuration over two SSDs, a second array constituting six HDDs in a striped configuration with or without parity, and a hierarchical storage management (HSM) manager.

Additional embodiments of PCIe-based mass storage systems 10 of this invention are represented in FIGS. 4 through 6 as three-tiered storage systems, in which one or more volatile memory components 32 are included as an additional storage tier (level) of the mass storage systems 10. In particular, FIGS. 4, 5 and 6 represent mass storage systems 10 whose first storage tier is provided by an array 44 of volatile memory components 32, while second and third storage tiers of the systems 10 are represented by, respectively, two arrays 34 of NAND flash memory components 36 (along with their respective SSD controllers 38) and an array 40 of miniature hard disk drives 42. It should be noted that the NAND flash memory components 36 and SSD controllers 38 are representative of the memory components and controllers that could be used in the SSD storage devices 20 of FIGS. 1, 2 and 3, and the hard disk drives 42 are representative of the hard disk drives that could be used in the HDD storage devices 20 of FIGS. 1, 2 and 3. In contrast to the embodiments of FIGS. 1 through 3, all memory components of the three storage tiers are mounted directly to the surface of the carrier board 12. However, it should be appreciated that the removable drive approach represented in FIGS. 1 through 3 could be implemented in the embodiments of FIGS. 4 through 6. In particular, the volatile memory components 32 could be in the form factor of a removable single inline memory module (SIMM) or dual inline memory module (DIMM).

In FIG. 4, the NAND flash memory components 36 and their respective SSD controllers 38 are addressed through a first RAID controller 14 mounted on the carrier board 12, and the array 40 of hard disk drives 42 are accessed through a second RAID controller 14 mounted on the carrier board 12. The embodiment of FIG. 5 is similar to that of FIG. 4, but further includes a PCIe switch 46 adapted for interfacing with the system logic. As discussed previously in reference to the embodiment of FIG. 3, the PCIe switch can be used to interface with all PCIe lanes of the system 10 at the host system interface level, and then arbitrate the lanes either through physical splitting or through time-division multiplexing. Finally, the embodiment of FIG. 6 is also similar to that of FIG. 4, but uses a single RAID controller 14 and further includes an HSM manager 48. The mass storage system 10 of FIG. 6 can be used in an eight-channel PCIe configuration with one array in a striping configuration over two SSD storage devices (the two arrays 34 of NAND flash memory components 36) and a second array in a striping configuration over an HDD storage device (the hard disk drives 42) with distributed parity. Parity calculations for the array 40 of hard disk drives 42 can be carried out in hardware by the RAID controller 14. As previously noted, the HSM manager 48 may be in the form of an FPGA or ASIC.

The volatile memory space of the three-tiered storage systems represented in FIGS. 4-6 can be established through the array 44 of volatile memory components 32 being in the form of a suitable module, for example, a standard un-registered dual inline memory module (DIMM), a single inline memory module (SIMM), or a small outline dual inline memory module SO-DIMM of any suitable design of SDRAM, including the various generations of DDR-SDRAM or SGRAM. Addressing and control of the array 44 of volatile memory components 32 can be implemented using standards DRAM control methods and circuits. Alternatively, the volatile memory components 32 can be mounted directly on the carrier board 12 as individual components, as represented for the volatile memory components 16 of FIGS. 1-3.

As another alternative, MRAM or similar nonvolatile memory technology can be used in place of the volatile memory components 32. MRAM components have similar timing characteristics as DRAM and can be configured to have a (DDR) SDRAM-like interface, using time-multiplexing of addresses with simultaneous issuance of standard SDRAM control signals. A notable advantage of MRAM is that it is nonvolatile while being comparable with DRAM with respect to write endurance and error rates.

As noted above, the array 44 of volatile memory components 32 functionally serves as the first storage tier of the mass storage systems 10 of FIGS. 4, 5 and 6. The array 44 provides a large cache size of write media, similar to that used on high-end RAID controllers. More specifically, the array 44 is functionally comparable to a RAM disk, in that the array 44 is a volatile extension of the disk space and is part of the virtual memory space of the host system, rather than a partition of the physical memory of the host system. Especially in any 32-bit operating system, this has the further advantage of not interfering with any memory address space limitations since the volatile memory components 32 are part of the virtual memory space as opposed to the physical system memory address space. In most cases, this will have a limited impact since the expected area of usage will be within a 64-bit operating system.

In the embodiments of FIGS. 4, 5 and 6, all writes from the host system will initially go to the array 44 of volatile memory components 32. This includes data and metadata, and takes advantage of the practically unlimited write endurance of volatile memory components such as SDRAM. Because of cost and power consumption reasons, it is advantageous to use unregistered modules as the array 44, though in critical applications registered ECC modules may be used. If unregistered SO-DIMMs are used as the array 44, it is possible to have common power and ground going to the entire module, but then split the data, address and command buses into upper 32-bit and lower 32-bit halves and then allocate each half to one of the SSD controllers 38. Alternatively, two SO-DIMMs may be used to give full independent access of one module to each SSD controller 38. Because the volatile memory components 32 are configured as a cache of the nonvolatile NAND flash arrays 34, data can be committed directly to the NAND flash memory components 36 without accessing the host. Cache management can be done either in software or performed on a custom FPGA or ASIC.

Particularly in the case of a power failure, it is of ultimate importance to assure that the direct memory dump from the volatile to the nonvolatile memory domain of the mass storage system 10 can be accomplished in a relatively short period of time, even if the rest of the host system is down, for example, as a consequence of a power outage. Back-up power for the system 10 can be supplied by an electric double-layer capacitor (EDLC), also known as a super capacitor. Alternatively, the inertia of the spindles of the rotating platters of the HDD storage devices 20 (for example, the mini-HDDs of FIGS. 4 through 6) may be used to generate enough power to allow for a data dump from the volatile memory components 32 to the NAND flash memory components 36.

In order to warrant a successful dump of the data from the array 44 of volatile memory components 32 to the arrays 34 of NAND flash memory components 36, it is also important that fresh flash memory blocks are available at least at a capacity equaling the volatile array 44. These blocks can be part of an over-provisioning pool of flash memory blocks in the array 36 of NAND flash memory components 36 that are always in an erased state for immediate programming without the need for an erase cycle.

A particular feature available with mass storage systems 10 containing volatile memory components 32 as the first storage tier of the system 10 is the ability to scan compressed files for malicious code, including viruses and malware. Since compression algorithms are capable of masking malicious patterns used for virus detection, it is in most cases necessary to decompress suspicious files and write them to a temp directory in order to scan them. After the scan is completed, the files in the temp directory are purged. A daily routine system virus scan on an average computer system can result in as much as 20-30 GB/day of data written to any storage device for no other purpose than scanning, followed by their immediate deletion. Similar rules apply for essentially any other temporary files, such as installation files, etc., that are typically purged immediately after the installation of a program has been completed. The volatile array 44 as the first tier can dramatically reduce overall wear and increase the life span of the nonvolatile array. In this regard, by scanning files when first written to the first storage tier formed by the volatile memory components 32, the overall life span of the nonvolatile array 36 can be dramatically increased. Accordingly, it is advantageous for temporary files to be automatically allocated to the volatile memory components 32 of the mass storage system 10.

Similar to the two-tier mass storage systems 10 of FIGS. 1 through 3, the time stamp and access frequency of any file written to one of the three-tier mass storage systems 10 of FIGS. 4 through 6 can be logged and, if the data no longer exceed a read access frequency threshold (or match some other high priority criterion), they can be purged from the first storage tier to either the second or third storage tier of the systems 10, depending on read access frequency thresholds pre-established for the second and third tiers.

In the case of read accesses, data can be accessed from the final storage tier defined by the hard disk drives 42 if they are not stored in one of the first and second storage tiers defined by the volatile and nonvolatile components 32 and 36, respectively. In the case of read-only data, for example, document retrieval or applications, the access frequency along with the size of the file can be used to determine which storage tier the data should be written to. For example, web servers with high accesses of hot topics can store .html or .php files in memory. An example would be the startup page of Windows Live™ Messenger, the contents of which are displayed in substantially identical form to all users of Windows Live™ Messenger for a full day without any changes.

If frequently accessed data become obsolete without change in contents, for example, on another day of Messenger contents, a new data set can be loaded from any of the higher storage tiers and there is no need to save the old data back to their original location. In this case, the data in the first storage tier are simply updated with the most recent updates. Likewise, in the case of applications that are frequently loaded during any given time and are therefore copied from the third storage tier defined by the hard disk drives 42 to one of the first and second storage tiers defined by the volatile and nonvolatile components 32 and 36, respectively, but where the binaries are not modified, it is unnecessary to write them back to the third storage tier. For example, a computer game could be frequently loaded until the user has finished the game. In this case, the application and the current game level would be copied from the third storage tier (hard disk drives 42) to the second storage tier (volatile components 36) prior to the first launch of the game, and as soon as the level has been completed and a new level is loaded, the old level is simply purged from the second storage tier. However, since the original copy is still resident in the third storage tier and the level itself is not modified during game play, there is no need to write the data back to the hard disk drives 42 of the third storage tier.

In all cases, it is imperative that the file system keeps track of the location of the most current file and possible modifications. Accordingly, any move or copy of any data or application file will need to also incur an update of the access path to point to the storage device (20, 32, 34 or 40) to which the data or file has been moved or copied. This can be accomplished through an HSM algorithms (e.g., with the HSM manager 48 of FIG. 6) using standard methods known in the art.

While the invention has been described in terms of specific embodiments, it is apparent that other forms could be adopted by one skilled in the art. Therefore, the scope of the invention is to be limited only by the following claims.

The invention claimed is:

1. A mass storage system for use in a host system, the mass storage system comprising:
   a printed circuit board having a Peripheral Component Interconnect Express (PCIe) edge connector adapted to interface with a PCIe expansion slot through multiple PCIe lanes, the edge connector being adapted to supply power to the mass storage system and enable data exchange between the mass storage system and a PCIe expansion slot;
   at least one volatile memory module having volatile memory components;
   at least one solid-state mass storage device having nonvolatile solid-state memory components and at least a first controller that interfaces with the nonvolatile solid-state memory components;
   at least one hard disk mass storage device having at least one hard disk drive with a rotatable platter; and
   at least a first Redundant Array of Independent Disks (RAID) controller on the printed circuit board that interfaces with the hard disk mass storage device;
   wherein the mass storage system is configured so that the volatile memory module is a cache for the solid-state mass storage device, the solid-state mass storage device permanently stores data with an access frequency above a threshold, the hard disk mass storage device stores data with an access frequency below the threshold
   wherein upon loss of power to the mass storage system, the mass storage system is adapted to recover energy from the rotatable platter of the hard disk mass storage device to perform a memory dump from the volatile memory module to the solid-state mass storage device.

2. The mass storage system of claim 1, wherein if the read access frequency of data stored on the hard disk mass storage device increases above the threshold, a copy of the data is written to the solid-state mass storage device.

3. The mass storage system of claim 1, wherein the solid-state mass storage device has an over-provisioning pool of at least the capacity of the volatile memory module.

4. The mass storage system of claim 1, wherein the at least one solid-state mass storage device and the at least one hard disk mass storage device are removably attached to the printed circuit board with docking connectors.

5. The mass storage system of claim 1, wherein at least one of the solid-state mass storage device and the hard disk mass storage device is integrated into the printed circuit board.

6. The mass storage system of claim 1, further comprising at least a second RAID controller, wherein the first and second RAID controllers interface with different PCIe lanes via the edge connector.

7. The mass storage system of claim 1, further comprising at least a second RAID controller and a PCIe switch, wherein the first and second RAID controllers interface with the edge connector through the PCIe switch.

8. The mass storage system of claim 7, wherein the first RAID controller controls a plurality of the hard disk drives in an array using striping with distributed parity and the second RAID controller controls at least two arrays of the nonvolatile solid-state memory components in striping mode.

9. The mass storage system of claim 8, wherein parity calculations for the hard disk drives are carried out in hardware by the first RAID controller.

10. The mass storage system of claim 1, wherein the nonvolatile solid-state memory components are chosen from the group consisting of NAND flash, phase change memory, magnetic RAM, and magneto-resistive RAM.

11. A method of using hierarchical storage management on a mass storage system in a host system, the method comprising:
   providing a mass storage system comprising a printed circuit board, an edge connector adapted to interface with a Peripheral Component Interconnect Express (PCIe) expansion slot through multiple PCIe lanes, at least one solid-state mass storage device having nonvolatile solid-state memory components and at least a first controller that interfaces with the nonvolatile solid-state memory components, at least one hard disk mass storage device having at least one hard disk drive with a rotatable platter, at least a first Redundant Array of Independent Disks (RAID) controller on the printed circuit board that interfaces with the hard disk mass storage device, and at least one memory module having memory components associated with the solid-state mass storage device;
   determining a frequency of access for a file stored on the hard disk mass storage device and copying the file to the solid-state mass storage device if the access frequency is above a threshold; and
   updating the access path for the file to point to the solid-state mass storage device
   wherein upon loss of power to the mass storage system, the mass storage system recovers energy from the rotatable platter of the hard disk mass storage device to perform a memory dump from the memory module to the solid-state mass storage device.

12. The method of claim 11, wherein the memory module is a volatile memory module, the memory components of the memory module are volatile memory components, and the solid-state mass storage device has an over-provisioning pool of at least the capacity of the volatile memory module.

13. The method of claim 11, further comprising removably installing the solid-state mass storage device and the hard disk mass storage device on and removing the solid-state mass storage device and the hard disk mass storage device from the printed circuit board using docking connectors.

14. The method of claim 11, wherein the mass storage system comprises a second solid-state mass storage device having nonvolatile solid-state memory components and a second controller that interfaces with the nonvolatile solid-state memory components thereof, the memory module is a 64-bit wide DRAM memory module configured to have separate address and command lines to an upper 32-bit block and a lower 32-bit block, the upper 32 bits serve as cache for the first solid-state mass storage device, and the lower 32 bits serve as cache for the second solid-state mass storage device.

15. The method of claim 11, wherein the memory module is a nonvolatile memory module and the memory components of the nonvolatile memory module are nonvolatile MRAM components with an SDRAM interface.

* * * * *